May 16, 1939. M. M. IDZAL Re. 21,082
STEREOSCOPIC PICTURE
Original Filed March 10, 1934
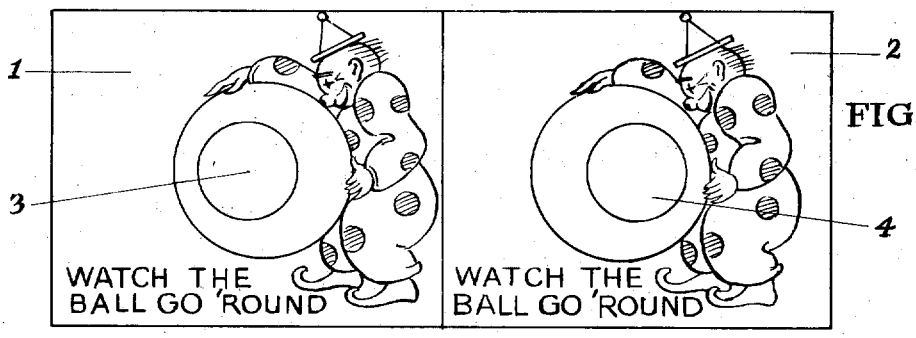
FIG. I
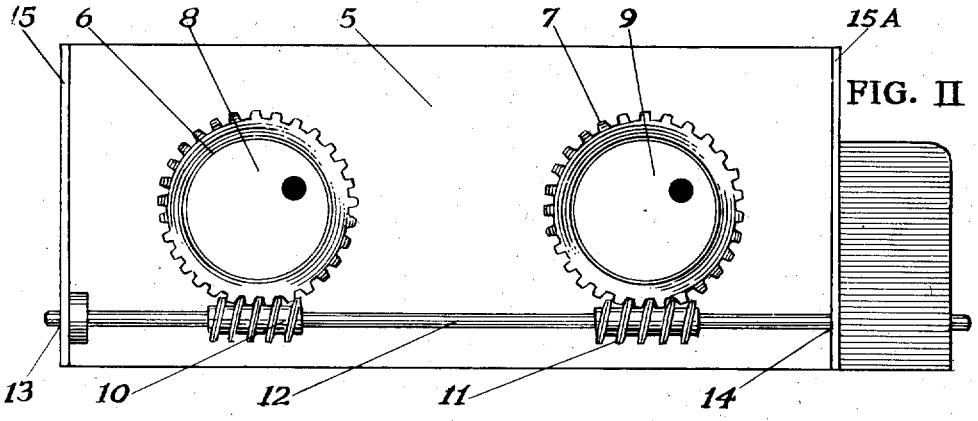
FIG. II
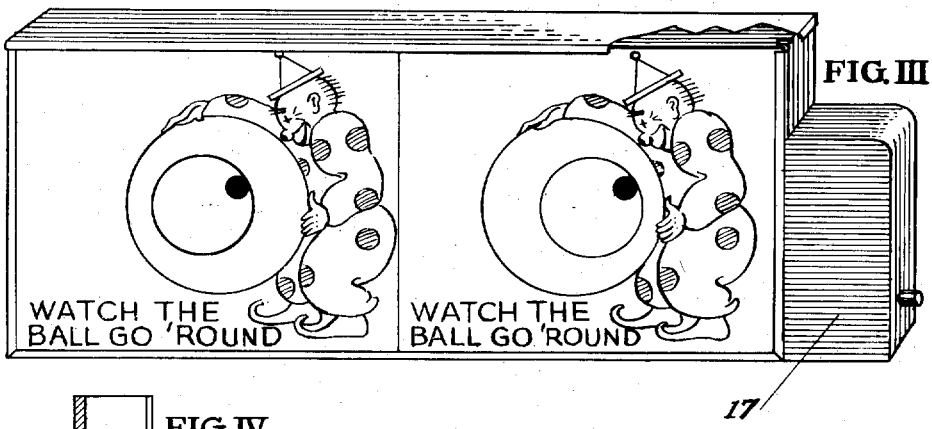
FIG. III
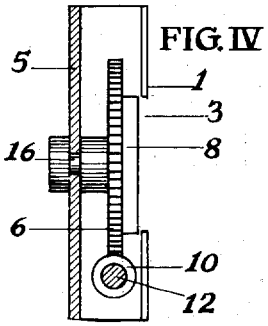
FIG. IV
*INVENTOR*
Milton M. Idzal Reissued May 16, 1939

Re. 21,082

UNITED STATES PATENT OFFICE 21,082

STEREOSCOPIC PICTURE

Milton M. Idzal, Sioux City, Iowa

Original No. 2,001,024, dated May 14, 1935, Serial No. 714,924, March 10, 1934. Application for reissue May 12, 1937, Serial No. 142,223

3 Claims. (Cl. 128—76.5)

This invention relates to improvements in stereoscopic pictures and has for its object the provision of a device of this character which will add the element of motion or animation to the picture when viewed stereoscopically for the purpose of holding the attention of the viewer, developing the sense of stereopsis and fusion and inducing beneficial activity of the extrinsic muscles of the eyes.

To attain these and other ends I provide a stereoscopic picture embodying cut-out portions placed in corresponding positions in the right view and the left view thereof, a pair of revolving discs situated immediately behind or in said cut-out portions in such a manner as to form a part of and complete said stereoscopic picture, and a means of imparting a synchronous revolving motion to said discs in such a manner as to give the appearance of animation to that part of the respective views that are mounted upon said discs.

With the above and other objects in view, the invention consists in the construction, combination and arrangements of parts hereinafter fully described and claimed, and illustrated in the accompanying drawing, wherein:

Figure 1 is a view of the front elevation of a stereoscopic picture device constructed in accordance with my invention.

Figure 2 is a view from the front of the device with the stereoscopic picture removed.

Figure 3 is a view of the front elevation of the device completely assembled.

Figure 4 is a cut-away end view showing one of the worm and gear arrangements and the relative position of various members.

Referring to the drawing by reference numerals, 1 designates the left view and 2 designates the right view of the stereoscopic picture which constitutes the front member of this device. 3 and 4 designate cut-out openings of the front member in accordance with my invention. 5 is the back plate upon which gears 6 and 7 are mounted in a suitable manner. 8 and 9 are discs mounted upon gears 6 and 7, and bearing proper designs upon their front surfaces to appear in openings 3 and 4 in such a manner as to form a part of and complete views 1 and 2.

10 and 11 are worm gears mounted upon the shaft 12 in such a manner as to engage gears 6 and 7. 13 and 14 are points of bearing for shaft 12. 15 and 15A are formed by the back-plate 5 being bent forward at right angles to form bearings for the shaft 12. 16 is a method of mounting the gears to the back-plate. 17 is a motor housing with a motor (not shown) inside the housing driving the shaft 12.

From the foregoing description, taken in connection with the accompanying drawing it should be apparent that I have produced a device that has many advantages. Stereoscopic pictures as ordinarily used for entertainment or "orthoptic" treatments lack the qualities necessary to hold the observer's attention for a suitable length of time and to sufficiently stimulate the visual functions.

My invention will present form depth or stereopsis, color and motion to the eye, and in addition the front member will be interchangeable with other stereoscopic pictures designed to fit this device. It will be seen that this device will hold the attention of the observer or patient, will provide additional stimulation to the visual functions, and will induce activity of the extrinsic muscles of the eye in following the moving parts.

The above benefits and advantages are attained through the operation of shaft 12 which in driving the worms 10 and 11 correspondingly drives the gears 6 and 7 thereby rotating the discs 8 and 9 on which the movable object is placed or imprinted. This then provides a movable target in combination with a stereoscopic picture. For instance, the picture in the drawing will show the clown holding a bucket-like member in which the target rotates.

It should be understood that the drawing is merely illustrative and does not pretend to give exact proportions or to show exact method of holding various members in conjunction with one another. Furthermore, the said drawing is illustrative of a preferred construction, it being my expectation that various changes and modifications may be made without departing from the spirit and scope of my invention.

I claim as my invention:

1. A stereoscopic picture device embodying a front member presenting a stereoscopic picture, a circular aperture placed in the right view of said stereoscopic picture in a relative position corresponding with a similar aperture placed in the left view of said picture, a pair of discs fitting behind said apertures and including on their front surfaces designs completing and forming a part of said right and left views, a pair of gears upon which said discs are mounted, a shaft bearing a pair of worm gears engaging said gears, a rear member or back plate which is bent forward at either extremity in such a manner as to engage the front member and hold same in position, and said back plate designed to provide bearings for said gears and worm gear shaft, and to hold the entire mechanism in proper assembly, and an electric motor engaging the end of the worm gear shaft.

2. A stereoscopic picture device embodying a front member of cardboard or similar opaque material presenting a stereoscopic picture, apertures located in corresponding positions in the right and left views thereof, discs placed in said apertures and including eccentrically placed designs completing said stereoscopic picture, laterally spaced gears upon which said discs are mounted, a shaft bearing worm gears engaging said gears, an electric motor engaging the end of the worm gear shaft, and a back plate designed to provide bearings for said shaft and gears and to hold the entire mechanism in proper assembly.

3. A vertically extending stereoscopic picture element including right and left views, the picture element having two apertures, said apertures being located in corresponding positions of the two views, rotatable disk means, one for each aperture, means for rotatably mounting said disks closely adjacent and with the plane of the disk in substantially parallel relation to the picture element, so that one disk is exposed to view through each of the apertures, target means eccentrically positioned on each disk, each target means having a design completing and forming a part of the associated right and left eye views, and means for rotating said disks.

MILTON M. IDZAL.